(12) United States Patent
Hunter et al.

(10) Patent No.: US 7,763,218 B2
(45) Date of Patent: Jul. 27, 2010

(54) PARTIAL CONVERSION HYDROCRACKING PROCESS AND APPARATUS

(75) Inventors: Michael Glenn Hunter, Orange, CA (US); Angelica Hidalgo Vivas, Herlev (DK); Lars Skov Jensen, Lejre (DK); Gordon Gongngai Low, Tustin, CA (US)

(73) Assignee: Haldor Topsoe A/S, Lyngby (DK)

( * ) Notice: Subject to any disclaimer, the term of this patent is extended or adjusted under 35 U.S.C. 154(b) by 956 days.

(21) Appl. No.: 11/234,163

(22) Filed: Sep. 26, 2005

(65) Prior Publication Data

US 2007/0068851 A1  Mar. 29, 2007

(51) Int. Cl.
  *B01J 8/04* (2006.01)
  *C10G 45/00* (2006.01)
  *B01D 47/00* (2006.01)
  *B01D 45/08* (2006.01)

(52) U.S. Cl. ............... 422/191; 422/188; 422/190; 208/57; 208/210; 208/361; 96/234; 55/462; 55/464; 55/440; 55/434

(58) Field of Classification Search ............ 55/241, 55/462, 464, 440, 434; 208/210, 361, 57; 96/234; 422/188, 190, 191
See application file for complete search history.

(56) References Cited

U.S. PATENT DOCUMENTS

| | | | | |
|---|---|---|---|---|
| 3,260,663 A | * | 7/1966 | Inwood et al. | 208/59 |
| 3,297,566 A | * | 1/1967 | Moyer et al. | 208/355 |
| 4,002,432 A | * | 1/1977 | Brice et al. | 208/100 |
| 4,270,975 A | * | 6/1981 | Bennett | 159/27.2 |
| 5,403,469 A | * | 4/1995 | Vauk et al. | 208/78 |
| 6,294,079 B1 | * | 9/2001 | Thakkar et al. | 208/59 |

* cited by examiner

*Primary Examiner*—Walter D Griffin
*Assistant Examiner*—Huy-Tram Nguyen
(74) *Attorney, Agent, or Firm*—Dickstein Shapiro LLP (57) ABSTRACT

Partial conversion hydrocracking process comprising the steps of (a) hydrotreating a hydrocarbon feedstock with a hydrogen-rich gas to produce a hydrotreated effluent stream comprising a liquid/vapour mixture and separating the liquid/vapour mixture into a liquid phase and a vapour phase, and (b) separating the liquid phase into a controlled liquid portion and an excess liquid portion, and

(c) combining the vapour phase with the excess liquid portion to form a vapour plus liquid portion, and (d) separating an FCC feed-containing fraction from the controlled liquid portion and simultaneously hydrocracking the vapour plus liquid portion to produce a diesel-containing fraction, or hydrocracking the controlled liquid portion to produce a diesel-containing fraction and simultaneously separating a FCC feed-containing fraction from the vapour plus liquid portion.

The invention also includes an apparatus for carrying out the partial conversion hydrocracking process.

4 Claims, 4 Drawing Sheets

PARTIAL CONVERSION HYDROCRACKING PROCESS AND APPARATUS

The invention relates to a partial conversion hydrocracking process and apparatus whereby heavy petroleum feed is hydrotreated and partially converted to produce feed for a fluid catalytic cracking (FCC) unit. The invention is particularly useful in the production of ultra low sulfur diesel (ULSD) and high quality FCC feed, which can be used to produce ultra low sulfur gasoline (USLG) in the FCC unit without post treating the FCC gasoline to meet sulfur specifications.

BACKGROUND OF THE INVENTION

Partial conversion or "Mild" hydrocracking has been utilized by refiners for many years to produce incremental middle distillate yields while upgrading feedstock for fluid catalytic cracking (FCC). Initially, specialized catalysts were adapted to the low or moderate pressure conditions in FCC feed desulfurizers to achieve 20 to 30 percent conversion of heavy gas oils to diesel and lighter products. The combination of low pressure and high temperatures used to achieve hydroconversion conditions typically resulted in heavy, high aromatic products with low cetane quality. The promulgation of new specifications for both gasoline and diesel products has put pressure on such processes to make lighter, lower sulfur products that can fit into the refinery ultra low sulfur diesel and gasoline (ULSD and ULSG) pools. The continued growth in middle distillate fuel demand compared to gasoline has re-focused attention on hydrocracking and particularly on partial conversion hydrocracking as a key process option for adapting to the modern clean fuels environment.

New specifications in both the U.S. and E.U. have mandated dramatic reductions in both diesel and gasoline sulfur levels. It is now clear that lower sulfur levels in these products provide substantial benefits in terms of decreased tail pipe emissions from automobiles and trucks. Pipeline transportation of both low sulfur and high sulfur distillate grades is still a work in progress. Recent studies in the U.S. indicate that as much as 10% of ultra low sulfur diesel (ULSD) will be downgraded by common pipeline transportation, and some carriers are requiring that ULSD be no more than 5 wppm sulfur at the refinery boundary. The environmental benefits and product transportation logistics make it certain that there will be continued pressure to force all fuels into the ultra low sulfur category.

Conventional partial conversion units utilised in many refineries around the world have been designed for pressure levels in the 50 to 100 barg range depending on feed quality and cycle life objectives. They have been designed to achieve 20% to 30% net conversion of heavy vacuum gas oil and total sulfur removal of about 95% to yield FCC feed suitable for making low sulfur gasoline. The process configuration has evolved to include hot high pressure separators for better heat integration and amine absorbers to mitigate the effects of very high recycle gas hydrogen sulfide content.

One significant shortcoming of this technology has been the inability to have independent control of hydro-conversion and hydro-desulfurization reaction severity. While the diesel product sulfur can be decreased to a large extent by applying more hydrotreating catalyst and achieving deeper HDS severity, the only real option for improving density and cetane quality is to increase reactor operating pressure or to increase hydrocracking severity.

Large increases in reactor pressure can raise chemical hydrogen consumption by 70% to 100%. The high capital and operating cost associated with such large increases in hydrogen consumption is a significant disadvantage for utilizing high pressure designs to achieve product uplift.

WO patent application No. 99/47626 discloses an integrated hydroconversion process comprising hydrocracking a combined refinery and hydrogen stream to form liquid and gaseous components. Unreacted hydrogen from the hydrocracking step is combined with a second refinery stream and hydrotreated. The product is separated into a hydrogen stream and a portion of this stream is recycled to the hydrocracking step. Higher yields of naphtha and diesel and lower yields of fuel oil were obtained. However, this process has the disadvantage of requiring a feedstock with relatively low nitrogen, sulfur and aromatics content. This implies, in many cases, that the feedstock needs to be pre-treated prior to the disclosed process.

U.S. Pat. No. 6,294,079 discloses an integrated low conversion process comprising separating the effluent from a hydrotreating step into three fractions: a light fraction, an intermediate fraction and a heavy fraction. The light fraction and a portion of the intermediate and heavy fractions are bypassed the hydrocracking zone and sent to a separator. A series of high pressure separators are used. The remaining intermediate and heavy fractions are hydrocracked.

FCC feedstock is produced. An augmented separator and other separators are used to separate the hydrotreater effluent into a vapour stream and two liquid streams. Parts of each liquid stream are flow controlled and remixed with the cooled, compressed vapour stream, reheated and hydrocracked at high severity to produce the higher quality middle distillate products. The complex arrangement of multiple separators and the cooling of the vapour stream lead to the use of extra equipment and added cost.

Increasing overall hydrocracking severity is at times not a viable option. When the process objective is to make a required amount of FCC feed, a high conversion leads to the formation of good quality diesel. However, high conversion also results in production of insufficient FCC feed since more diesel is produced.

The objective of this invention is to provide a process and apparatus in which FCC feed is treated to produce ultra low sulfur FCC feed suitable for production of ultra low sulfur gasoline (USLG) not requiring gasoline post treatment.

Another objective of this invention is to provide a process and apparatus for producing diesel with an ultra low sulfur content and substantially improved ignition quality as measured by cetane number, cetane index, aromatics content and density.

A further objective of this invention is to provide a simple apparatus for carrying out the process of the invention.

SUMMARY OF THE INVENTION

The process of the invention comprises hydrotreating and partially converting a heavy petroleum feed stream which boils above 260° C. while being low in asphaltenes (<0.1 wt %). By simultaneously producing high quality FCC feed the process creates the possibility of producing ultra low sulfur gasoline (USLG) from the FCC unit. Diesel and naphtha are also produced.

The process of the invention comprises a partial conversion hydrocracking process comprising the steps of
(a) hydrotreating a hydrocarbon feedstock with a hydrogen-rich gas to produce a hydrotreated effluent stream comprising a liquid/vapour mixture and separating the liquid/vapour mixture into a liquid phase and a vapour phase, and (b) separating the liquid phase into a controlled liquid portion and an excess liquid portion, and
(c) combining the vapour phase with the excess liquid portion to form a vapour plus liquid portion, and
(d) separating an FCC feed-containing fraction from the controlled liquid portion and simultaneously hydrocracking the vapour plus liquid portion to produce a diesel-containing fraction, or hydrocracking the controlled liquid portion to produce a diesel-containing fraction and simultaneously separating a FCC feed-containing fraction from the vapour plus liquid portion.

The apparatus of the invention comprises an apparatus for the partial conversion hydrocracking process comprising a hydrotreating reactor having one or more catalytic beds and in series with a hydrocracking reactor, and having an liquid/vapour separation system downstream the one or more catalytic beds of the hydrotreating reactor, the liquid/vapour separation system comprising an outlet device and an outlet pipe in a separator vessel, the outlet device comprising a pipe extension above the bottom of the separation vessel, the pipe extension being provided with an anti-swirl baffle at the top open end of the pipe extension, the separator vessel being provided with an outlet pipe at the separator vessel bottom, the outlet pipe being provided with an anti-swirl baffle.

DETAILED DESCRIPTION OF THE INVENTION

The process of the invention is a medium pressure partial conversion hydrocracking process comprising a hydrotreating step and a hydrocracking step. The process and apparatus of the invention provides a solution that meets current and expected product specifications for both gasoline and diesel fuel without the need for further processing or blending with other lighter, higher quality components. An advantage of the process is that both hydrogen partial pressure and hydrocracking conversion can be utilized for diesel quality improvement, while maintaining the relatively low overall conversion and HDS (hydrodesulfurization) severity requirements dictated by FCC pretreatment applications.

By the term "hydrotreating" (HDT) is meant a process carried out in the presence of hydrogen whereby heteroatoms such as sulfur and nitrogen are removed from hydrocarbon feedstock and the aromatic content of the hydrocarbon feedstock is reduced. Hydrotreating covers hydrodesulfurization and hydrodenitrogenation.

By the term "hydrodesulfurization" (HDS) is meant the process, whereby sulfur is removed from the hydrocarbon feedstock.

By the term "hydrodenitrogenation" (HDN) is meant the process, whereby nitrogen is removed from the hydrocarbon feedstock.

By the term "hydrocracking" (HC) is meant a process, whereby a hydrocarbon containing feedstock is catalytically decomposed into a chemical species of smaller molecular weight in the presence of hydrogen.

In the process of the invention the main reactor loop of the process has two reactors in series, a hydrotreating reactor for pretreatment of the feedstock and a hydrocracking reactor for hydrocracking a part of the effluent from the hydrotreating reactor. By the term "in series" is meant the hydrocracking reactor is located downstream the hydrotreating reactor.

There is a liquid/vapour separation system integrated in the bottom of the hydrotreating reactor or contained in a separator vessel located between the two reactors for separating the effluent, a mixture of liquid and vapour, emerging from the catalytic beds of the hydrotreating reactor.

In the liquid/vapour separation system a flash is carried out using an outlet device and an outlet pipe. The liquid/vapour mixture separates into a liquid phase and a vapour phase in the separator vessel. The outlet device is an internal overflow standpipe for dividing the liquid phase into a controlled liquid portion and an excess liquid portion. The vapour phase is combined with the excess liquid portion and this vapour plus liquid portion can be fed to the hydrocracking reactor. In this case the controlled liquid portion is withdrawn, bypassing the hydrocracking reactor and is routed to a stripper to produce FCC feed and naphtha and lighter products. It is also possible to send the controlled liquid portion to the hydrocracking reactor and simultaneously separating a FCC feed-containing fraction from the vapour plus liquid portion.

By the term "flash" is meant a single stage distillation in which the hydrotreated effluent stream comprising a liquid/vapour mixture is separated into a liquid portion and a vapour plus liquid portion. A change in pressure is not required.

An advantage of the process of the invention is that a simple flash step is used instead of a complex augmented and multi-separator scheme to split the effluent from the catalytic beds of the hydrotreating reactor into the two portions. The vapour plus liquid portion is sent to the hydrocracking reactor without substantially cooling the vapour, other than the cooling required for temperature control to the inlet of the hydrocracking reactor.

Part of the liquid phase in the hydrotreater effluent is routed to an FCC feed stripper. A low pressure flash drum can optionally be added. Only naphtha and lighter hydrocarbons are recovered. The diesel contained in this portion is of lower quality since it has a higher density, higher aromatic content and lower cetane value than the diesel produced in the hydrocracking reactor, so it is better suited as an FCC feed. The entire diesel produced by the inventive process is produced in the hydrocracking step and have a much improved quality.

An unconverted oil that has a boiling range higher than the diesel product (>370° C.+) is recovered from the hydrocracked effluent in a fractionator column. This is unconverted and can be used as FCC feed or as feedstock for an ethylene plant or a lube plant because it has higher hydrogen content and lower aromatic content than the FCC feed produced in the FCC feed stripper.

Suitable feedstock for the process of the invention is vacuum gas oil (VGO), heavy coker gas oil (HCGO), thermally cracked or visbroken gas oil (TCGO or VBGO) and deasphalted oil (DAO) derived from crude petroleum or other synthetically produced hydrocarbon oil. The boiling range of such feeds are in the range of 300° C. to 700° C. with sulfur content of 0.5 to 4 wt % and nitrogen content of 500 to 10,000 wppm.

The objective of the hydrotreating reactor is mainly to desulfurize the feed down to a level of 200 to 1000 wtppm sulfur, which will result in an FCC gasoline with ultra-low sulfur content suitable for blending to meet both European and U.S. specifications (10 and 30 wtppm, respectively), obviating the need for gasoline post-hydrotreating. The low sulfur content in the feed also has the benefit of dramatically reducing emissions of sulfur oxides (SOx) from the FCC regenerator. Secondly, the hydrotreating reactor reduces the nitrogen content in the feed to the hydrocracking reactor. Thirdly, the aromatic content of the FCC feed is also reduced, which will result in higher conversion and higher gasoline yields.

The hydrotreating reactor comprises a hydrotreating zone followed by a separation zone. The hydrotreating zone contains one or more catalyst beds for hydrodesulfurization (HDS) and hydrodenitrogenation (HDN) of the feedstock. The products from the hydrotreating zone comprise a mixture of liquid and vapour. In a conventional hydrotreating reactor, the catalyst beds are supported by bed support beams and the head space in the bottom reactor head is filled with inert balls that support the last catalyst bed. The mixture of vapour and liquid leaves the reactor via an outlet collector which sits on the bottom reactor head.

In an embodiment of the inventive process, the last catalyst bed in the hydrotreating reactor is supported by bed support beams just like the upper beds. However, instead of holding a large volume of inert balls, the head space in the bottom reactor head is used to separate the liquid/vapour mixture. The liquid/vapour separation system is used in the bottom head to split the mixture of liquid and vapour from the catalytic beds of the hydrotreating reactor into a liquid portion and a vapour portion containing a fraction of liquid, i.e. a vapour plus liquid portion.

The vapour plus liquid portion can be directed to the hydrocracking reactor and converted under suitable conditions to produce ULSD. The feed to the FCC is mainly composed of the liquid portion.

The liquid/vapour separation system is integrated in the hydrotreating reactor and located in the head space at the bottom of this reactor. It comprises an outlet device for transfer of the vapour plus liquid portion to the hydrocracking reactor. The liquid portion is contained in the reactor bottom outside the outlet device and leaves the hydrotreating reactor separately through the outlet pipe for transfer to, for instance, a stripper. The level of the liquid portion in the reactor bottom and hence the amount of liquid transferred to the stripper is controlled by conventional flow control valves. Excess liquid not required for transfer to the stripper thereby enters the outlet device with all the vapour and leaves the reactor as the vapour plus liquid portion.

The amount of liquid, i.e. the controlled liquid portion, withdrawn by the outlet pipe is set by the desired HVGO conversion. The controlled liquid portion comprises 30-100 wt % of the liquid phase, and the excess liquid portion comprises 0-70 wt % of the liquid phase. Preferably the controlled liquid portion comprises 60-95 wt % of the liquid phase, and the excess liquid portion comprises 5-40 wt % of the liquid phase.

The integration of the liquid/vapour separation system in the hydrotreating reactor has the advantage of reducing the amount of processing equipment when compared to conventional separation outside the reactor. Conventional separation outside the reactor would require addition of a high pressure separator vessel with the accompanying disadvantage of increased capital cost.

The controlled liquid portion is sent to a stripper in which a stream of steam removes the light hydrocarbons in the naphtha boiling range and hydrogen sulfide ($H_2S$) and ammonia ($NH_3$) dissolved in the liquid. The stripped product is used as feed for the FCC unit. The light overhead products from the stripper are comprised predominantly of naphtha boiling range light hydrocarbons together with ammonia and hydrogen sulfide.

All the vapour plus liquid portion leaves the separation zone of the hydrotreating reactor and is transferred to the hydrocracking reactor. The hydrocracking reactor also contains one or more catalytic beds. This reactor may contain some hydrotreating catalyst to further lower the nitrogen to an optimum level (<100 wppm) and a number of beds of hydrocracking catalyst. The products from the hydrocracking reactor are cooled and transferred to an external high pressure separator vessel. A gaseous hydrogen-rich product stream is separated from the cracked product and recycled to the hydrotreating reactor. The liquid stream from the separator is sent to a distillation column where naphtha, diesel and unconverted oil products are fractionated.

Alternatively, in another embodiment of the invention, after leaving the separation zone where the products from the hydrotreating zone are split into a liquid portion and a vapour plus liquid portion, the vapour plus liquid portion is directed to a separator for removal of a hydrogen-rich stream. The hydrogen-rich stream can be further purified from hydrogen sulfide and ammonia by amine scrubbing and water washing. The liquid product from the separators (a high pressure hot separator in series with a high pressure cold separator) is mainly FCC feed and it is sent to stripping for removal of the light hydrocarbons, $H_2S$ and $NH_3$ dissolved in the liquid. The stripped product is used as feed for the FCC unit.

The liquid portion from the separation zone is sent to the hydrocracking reactor operating with a cracking severity sufficient to produce a diesel fraction with product properties in accordance with EN 590 ULSD specifications. Operating conditions in the hydrocracking reactor can be adjusted to provide a product satisfying U.S. market requirements. This embodiment provides a lower ammonia and hydrogen sulfide environment in the hydrocracking reactor which increases the hydrocracking catalyst activity.

In another embodiment of the invention, a second feed can be added as feed to the hydrocracking reactor. In this embodiment, the second feed can be hydrotreated and hydrocracked in the hydrocracking reactor and bypasses the hydrotreating reactor. One example of a second feed is a light cycle oil (LCO) from the FCC, which needs further hydrotreating and hydrocracking to convert it into high quality diesel, jet and naphtha.

Figure 1:
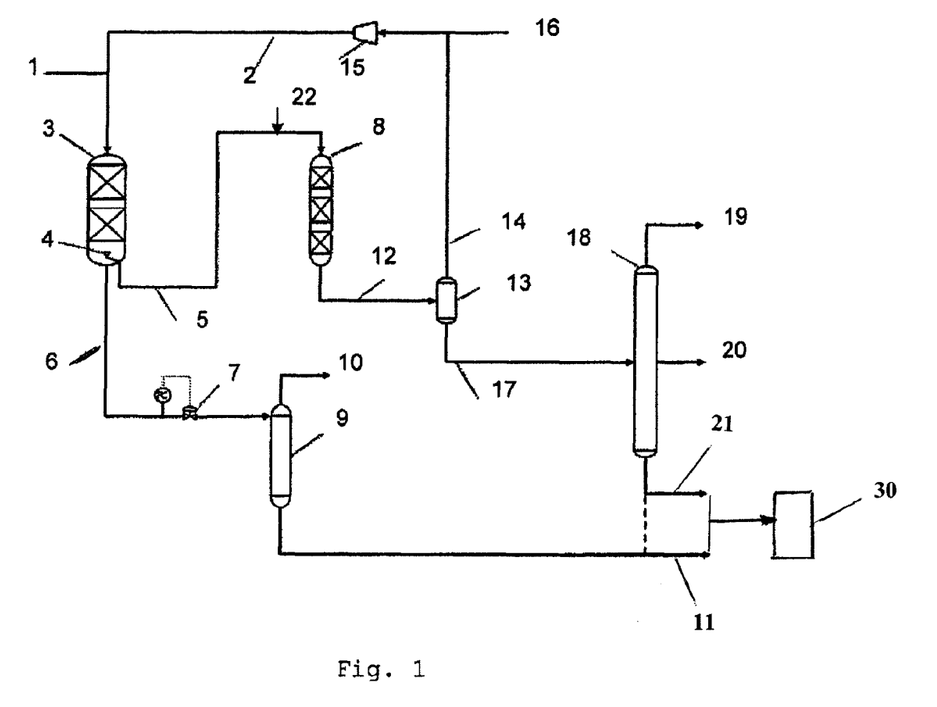
FIG. 1 shows a partial conversion hydrocracking process of the invention.

FIG. 1 illustrates an embodiment of the invention in which the vapour plus liquid portion from the separation zone is cracked in the hydrocracking reactor and the controlled liquid portion is sent to a stripper.

A feed 1 is combined with hydrogen, for instance a hydrogen-rich recycle gas 2, and sent to a hydrotreating reactor 3 for hydrodesulfurization and hydrodenitrogenation in one or more catalytic beds. The effluent from the one or more catalytic beds is a mixture of vapour and liquid which separates into a liquid phase and a vapour phase. In the separation zone 4 downstream the last catalytic bed separation into a vapour plus liquid portion 5 and a liquid portion 6 takes place using a liquid/vapour separation system integrated in the hydrotreating reactor.

Figure 3:
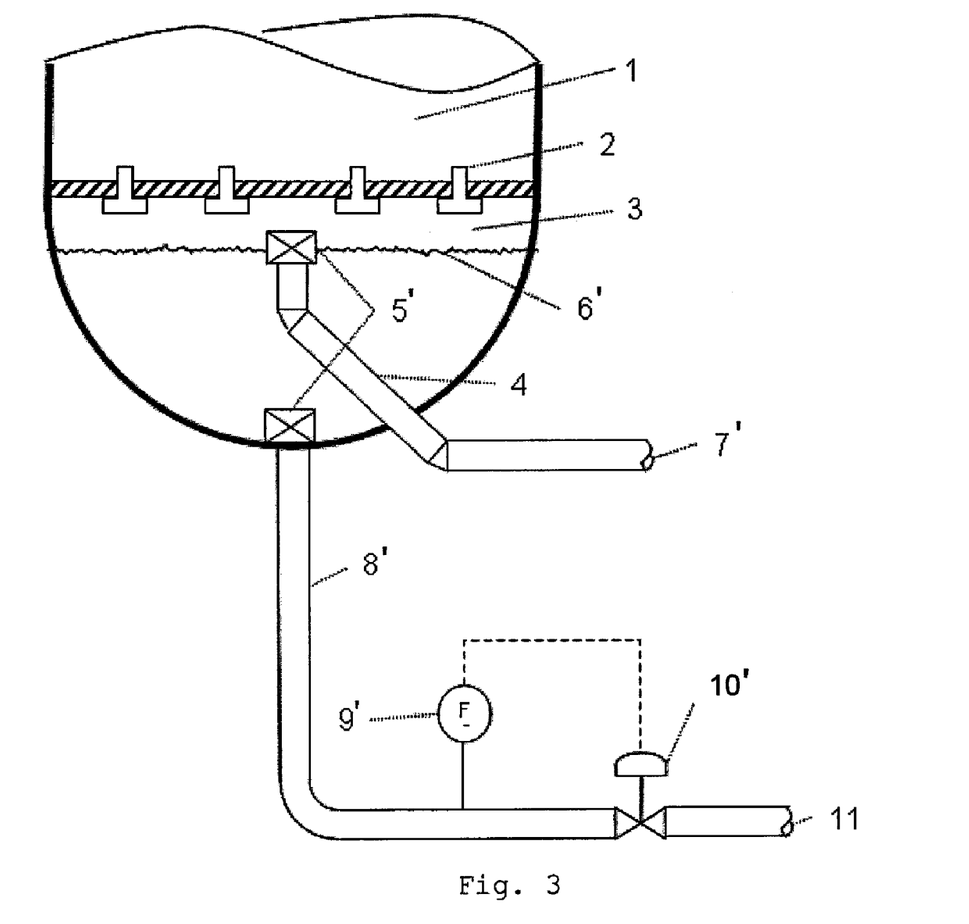
FIG. 3 shows a section through the bottom of the hydrotreatment reactor.

The liquid/vapour separation system comprises the outlet device and the outlet pipe (shown in FIG. 3). The liquid portion 6 consists of only liquid and the vapour plus liquid portion 5 includes all the vapour. The flow rate of the liquid portion 6 is controlled by conventional flow control valve 7, and excess liquid not required leaves the separation zone 4 as overflow through the outlet device together with all the vapour and thus forms the vapour plus liquid portion 5.

Controlled liquid portion 6 is comprised of heavy liquid hydrocarbons with substantially reduced sulfur and nitrogen content relative to the feed 1. It leaves the hydrotreating reactor 3 and bypasses the hydrocracking reactor 8 to enter a stripping column 9. Light hydrocarbons together with ammonia and hydrogen sulfide are separated into the overhead stream 10 from stripping column 9 and the resulting liquid stream from the bottom of the stripping column 9 is suitable as low sulfur FCC feed 11.

The vapour plus liquid portion 5 leaves the hydrotreating reactor 3. It may optionally be combined with a second hydrocarbon feedstock 22. It then enters the hydrocracking reactor 8 where it is catalytically cracked to form a hydrocracked effluent 12 having properties suitable for diesel fuel preparation. One or more catalyst beds are present in this reactor. The hydrocracked effluent 12 is sent to a separator vessel 13 and a hydrogen-rich gas stream 14 is recycled from the separator 13 to the hydrotreating reactor 3 via a recycle gas compressor 15. Make-up hydrogen 16 can be added to the hydrogen-rich stream 14 either upstream or downstream of the compressor 15 to maintain the required pressure. The liquid product 17 from the separator vessel 13 comprising light and heavy hydrocarbons together with dissolved ammonia and hydrogen sulfide is then sent to the fractionator column 18, where a naphtha stream 19 with ammonia and hydrogen sulfide are removed overhead. The heavy hydrocarbon components comprising a diesel stream 20 and an unconverted oil stream 21 are separated and recovered lower in the fractionator column 18. The naphtha stream 19 can be subjected to additional separation steps. The diesel stream 20 can also be further separated by boiling points into other valuable products such as aviation jet fuel.

Streams 11 (low sulfur FCC feed) and 21 (unconverted oil stream) are typically combined as a single feed for FCC unit 30 (shown in FIG. 1). However, stream 21 can also be kept segregated for use as a valuable intermediate product for making lubricating oils or as feed for making ethylene.

Separating the liquid phase into a controlled liquid portion and an excess liquid portion makes it possible to by-pass the controlled liquid portion around the hydrocracking reactor. This allows a high conversion in the hydrocracking reactor and this improves the diesel quality while maintaining a low overall conversion so the desired amount of FCC feed is produced.

Figure 2:
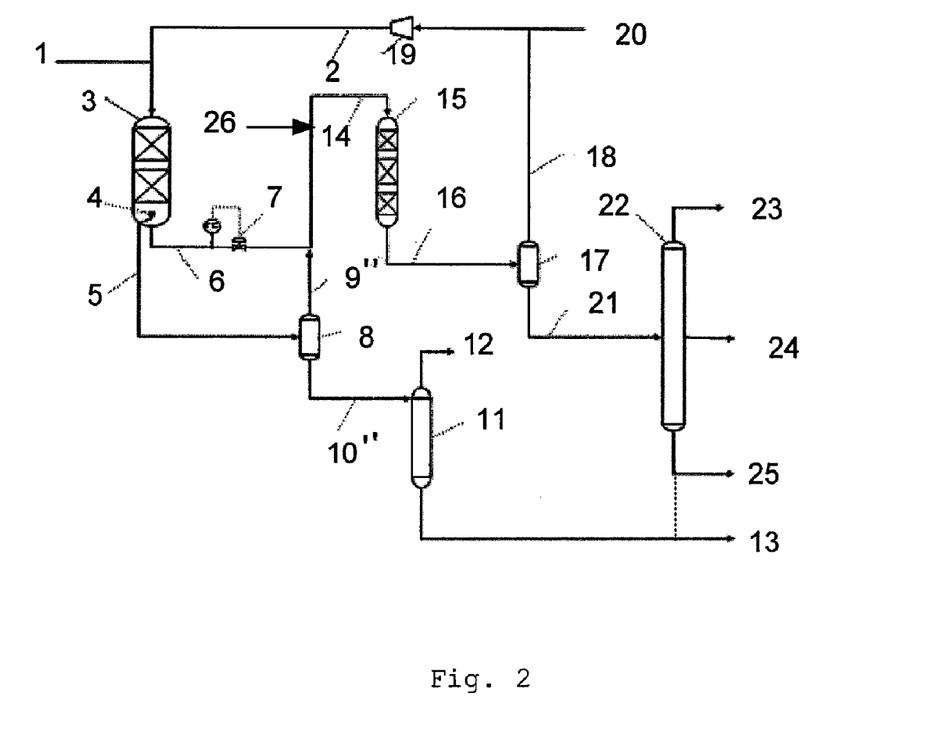
FIG. 2 shows an alternative partial conversion hydrocracking process of the invention.

FIG. 2 illustrates an embodiment of the invention in which the liquid portion from the separation zone is cracked in the hydrocracking reactor and the vapour plus liquid portion is sent to the stripper column.

A feed 1 is combined with hydrogen, for instance hydrogen rich recycle gas 2, and sent to a hydrotreating reactor 3 for hydrodesulfurization and hydrodenitrogenation in the one or more catalytic beds. The hydrotreated effluent stream comprising a liquid/vapour mixture enters the separation zone 4 downstream the last catalytic bed and is separated into a vapour plus liquid portion 5 and a controlled liquid portion 6 using the outlet device as described in FIG. 1. The flow rate of controlled liquid portion 6 is controlled by conventional flow control valve 7, and excess liquid not required leaves the separation zone 4 as overflow through the outlet device (shown in FIG. 3) together with all the vapour and thus forms the vapour plus liquid portion 5.

The vapour plus liquid portion 5 leaves the hydrotreating reactor 3 and flow to a separator vessel 8. A hydrogen-rich vapour stream 9" is produced from the separator overhead and a hydrocarbon liquid stream 10" is produced from the bottom of separator vessel 8. The hydrocarbon liquid stream 10 also contains dissolved ammonia and hydrogen sulfide and flows to the stripper column 11. A light hydrocarbons stream 12 together with ammonia and hydrogen sulfide are separated from stripper column 11 and the resulting liquid stream from the bottom of stripper column 11 is suitable as low sulfur FCC feed 13.

Controlled liquid portion 6 is comprised of heavy liquid hydrocarbons with substantially reduced sulfur and nitrogen content relative to the feed 1. It leaves the hydrotreating reactor through the flow control valve 7 and combines with hydrogen-rich vapour stream 9" from separator vessel 8 to make the mixed vapour-liquid stream 14. A second hydrocarbon feedstock 26 can optionally be added to the mixed vapour-liquid stream 14 if required. The mixed vapour-liquid stream 14, optionally combined with the second feed, enters the hydrocracking reactor 8, where it is catalytically cracked into the components of stream 16 having properties suitable for diesel fuel preparation. One or more catalyst beds are present in reactor 15. Stream 16 flows to separator vessel 17 where a hydrogen rich vapour stream 18 is separated overhead and recycled to the hydrotreating reactor via a recycle compressor 19. Make-up hydrogen 20 can be added to the hydrogen-rich stream 18 either upstream or downstream of the compressor 19 to maintain the required pressure.

The liquid product 21 from the separator 17 comprising light and heavy hydrocarbons together with dissolved ammonia and hydrogen sulfide is then sent to the fractionator column 22, where naphtha with ammonia and hydrogen sulfide are removed overhead in naphtha stream 23. The heavy hydrocarbon components comprising a diesel stream 24 and an unconverted oil stream 25 are separated and recovered lower in the fractionator column 22. Naphtha stream 23 can be subjected to additional separation steps. Diesel stream 24 can also be further separated by boiling points into other valuable products such as aviation jet fuel.

FIG. 3 shows an embodiment of the invention in which the bottom section of the hydrotreating reactor is adapted to include the liquid/vapour separation system. The separator vessel is therefore integrated in the bottom section of the hydrotreating reactor. The outlet device is located below the support of the last catalyst bed 1 and the support can typically be provided by beams and grids 2. A disengagement space 3 is created in the bottom of the reactor vessel to allow separation of vapour and liquid phases.

In this embodiment the outlet device is in the form of a standpipe 4 provided with an anti-swirl baffle 5' at the top open end of the standpipe 4. A liquid interface level 6' is created at the height of the baffle 5 which allows all the reactor vapour and a portion of the liquid phase to overflow as a vapour plus liquid portion and exit the reactor through transfer pipe 7' to the downstream hydrocracking reactor (not shown).

An outlet pipe 8' is provided for removing a controlled portion of the liquid phase from the centre low point of the bottom head of the reactor also covered by an anti-swirl baffle 5'. The flow of the liquid portion through outlet pipe 8 is regulated by the flow control element 9' through a standard flow control valve 10' through the transfer pipe 11 to a downstream stripper (not shown).

Figure 4:
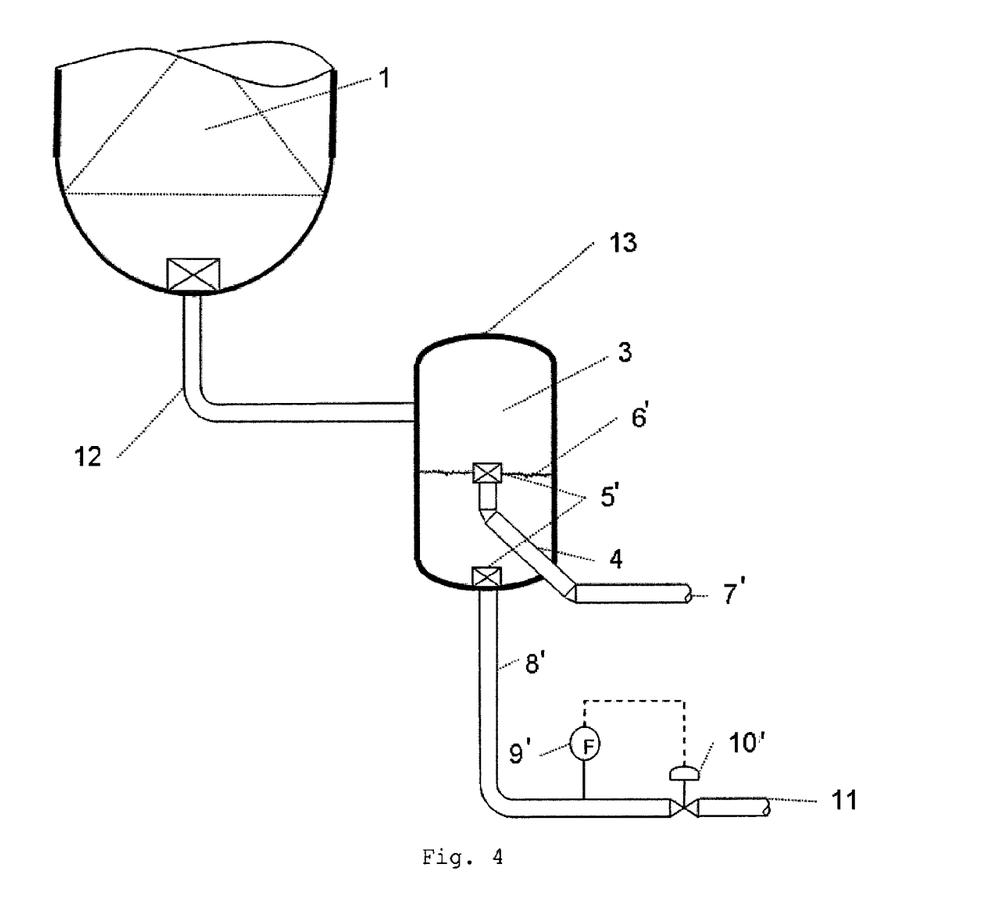
FIG. 4 shows the process of the invention where the liquid/vapour separation system is located between the hydrotreating reactor and the hydrocracking reactor.

FIG. 4 illustrates another embodiment of the invention where a separator vessel 13 containing the outlet device and the outlet pipe is added downstream of the hydrotreating reactor. The separator vessel 13 is connected by pipe 12 transferring all of the vapour and liquid contents from the bottom catalyst bed 1 of the hydrotreating reactor to the separator vessel 13. In this embodiment the outlet device is in the form of a standpipe 4 provided with an anti-swirl baffle 5' at the top open end of the pipe. A liquid interface level 6' is created at the height of the baffle 5' which allows all the reactor vapour and a portion of the liquid phase, i.e. the vapour plus liquid portion, to overflow and exit the hydrotreating reactor through transfer pipe 7' to the downstream hydrocracking reactor (not shown). An outlet pipe 8' is provided for removing a portion of the liquid phase, i.e. the controlled liquid portion, from the centre low point of the bottom head of the reactor also covered by an anti-swirl baffle 5. The flow through this pipe is regulated by the flow control element 9' through a standard flow control valve 10' through the transfer pipe 11 to a downstream stripper (not shown).

This embodiment of the invention is especially advantageous when existing plants have to be revamped. In such cases it may not be possible to install the liquid/vapour separation system in an already existing hydrotreating reactor. Installing the liquid/vapour separation system outside the hydrotreating reactor in the form of a separator vessel containing the outlet device and the outlet pipe directly downstream the hydrotreating reactor allows a separation of the mixture of vapour and liquid effluent from the hydrotreating reactor into a liquid stream and a vapour plus liquid stream suitable for further processing.

The effluent from the one or more catalytic beds in the hydrotreating reactor is a mixture of vapour and liquid which separates into a liquid phase and a vapour phase. The boiling range of the liquid phase is slightly lower than the boiling range of the feed entering the hydrotreating reactor. The liquid phase has a boiling range of 200-580° C.

Partial conversion hydrocracking catalysts useful in the process of the invention need to fulfil the following key functional requirements:

Size and activity grading to minimize fouling and pressure drop
Demetallization and carbon residue reduction
Hydrodesulfurization for FCC feed pre-treatment to sulfur levels of typically 100 to 1000 wppm
Hydrodenitrogentation for hydrocracker feed pre-treatment to nitrogen levels of typically 50 to 100 wppm
Hydrocracking with high conversion activity and high selectivity to diesel.

In order to maximize performance in each of these functional categories, stacked (multiple) catalyst systems are useful and provide better overall performance and lower cost compared with single multi-function catalyst systems. The process described here is useful in facilitating the independent control of reaction severity for multiple catalysts leading to optimized performance and longer useful life.

Hydrotreating catalysts are individually specified to optimize sulfur removal for FCC feed pretreatment and for nitrogen removal for hydrocracking feed pretreatment. Zeolitic and amorphous silica-alumina hydrocracking catalysts are also useful in the process of the invention to convert heavy feed to lighter products with high diesel yield.

The hydrotreating catalysts can for instance be based on cobalt, molybdenum, nickel and wolfram (tungsten) combinations such as CoMo, NiMo, NiCoMo and NiW and supported on suitable carriers. Examples of such catalysts are TK-558, TK-559 and TK-565 from Haldor Topsøe A/S. Suitable carrier materials are silica, alumina, silica-alumina, titania and other support materials known in the art. Other components may be included in the catalyst for instance phosphorous.

Hydrocracking catalysts may include an amorphous cracking component and/or a zeolite such as zeolite Y, ultrastable zeolite Y, dealuminated zeolites etc. Included can also be nickel and/or cobalt and molybdenum and/or wolfram combinations. Examples are TK-931, TK-941 and TK-951 from Haldor Topsøe A/S. The hydrocracking catalysts are also supported by suitable carriers such as silica, alumina, silica-alumina, titania and other conventional carriers known in the art. Other components may be included such as phosphorus may be included as reactivity promoters.

Reaction conditions in the hydrotreating reactor include a reactor temperature between 325° C.-425° C., a liquid hourly space velocity (LHSV) in the range 0.3 $hr^{-1}$ to 3.0 $hr^{-1}$, a gas/oil ratio of 500-1,000 $Nm^3/m^3$ and a reactor pressure of 80-140 bars.

Reaction conditions in the hydrocracking reactor include a reactor temperature between 325° C.-425° C., a liquid hourly space velocity (LHSV) in the range 0.3 $hr^{-1}$ to 3.0 $hr^{-1}$, a gas/oil ratio of 500-1,500 $Nm3/m^3$ and a reactor pressure of 80-140 bars.

The controlled liquid portion can comprise 30-100 wt % of the liquid phase, and the excess liquid portion can comprise 0-70 wt % of the liquid phase. Preferably the controlled liquid portion comprises 60-95 wt % of the liquid phase, and the excess liquid portion comprises 5-40 wt % of the liquid phase.

The current European standard EN 590 EU ULSD specifications for diesel are:

| | |
|---|---|
| Sulfur: | 10-50 wppm |
| Density: | <845 $kg/m^3$ |
| T95 (D-86): | <360° C. |
| Cetane No. D-630: | >51 |
| Cetane Index D-4737: | >46 |
| Poly-Aromatics: | <11% wt. |

The current U.S. standard specifications are less restrictive than the European Standard specifications mentioned above.

Yield terms are defined with respect to true boiling point (TBP) cuts and the following definitions are used in the examples:

| Component: | TBP Cut |
|---|---|
| Naphtha: | <150° C. |
| Kerosene: | 150-260° C. |
| Heavy diesel: | 260-390° C. |
| Full range diesel: | 150-390° C. |
| Unconverted: | >390° C. |

Conversion terms are defined are defined in the following, Feed and product values are in %:

$$390° C.+\text{net conversion}=\text{Feed}_{390°C+}-\text{Product}_{390°C+}$$

$$390° C.+\text{true conversion}=(\text{Feed}_{390°C+}-\text{Product}_{390°C+})/\text{Feed}_{390°C+}$$

$$390° C.+\text{gross conversion}=100-\text{Product}_{390°C+}$$

EXAMPLES

Example 1

In this example the liquid/vapour separation system is integrated in the hydrotreating reactor. This example shows how the different boiling ranges of the hydrotreating reactor effluent split in the flash at the outlet device and the outlet pipe in the liquid/vapour separation system.

Temperature and pressure of the hydrotreating reactor is shown at start-of-run conditions in Table 1 and end-of-run conditions in Table 2.

TABLE 1

| Press =<br>87.5 bar g<br>Temp =<br>396° C. | Naphtha<br>(C5-<br>150° C.) | Jet<br>(150-260° C.) | Diesel<br>(260-390° C.) | Gas Oil<br>(390° C.+) |
|---|---|---|---|---|
| Wt % in vapour phase | 73.9 | 58.4 | 23.8 | 5.2 |
| Wt % in liquid phase | 26.1 | 41.6 | 76.2 | 94.8 |

TABLE 2

| Press =<br>87.5 bar g<br>Temp =<br>430° C. | Naphtha<br>(C5-<br>150° C.) | Jet<br>(150-260° C.) | Diesel<br>(260-390° C.) | Gas Oil<br>(390° C.+) |
|---|---|---|---|---|
| Wt % in vapour phase | 83.4 | 73.7 | 44.9 | 17.8 |
| Wt % in liquid phase | 16.7 | 26.3 | 55.1 | 82.2 |

The results show that the liquid phase contains mainly gas oil boiling range material with some diesel material, but only a small portion of jet and naphtha. The diesel boiling range material from the hydrotreating reactor has a relatively high sulfur content and high density, and it contains a high content of mono-aromatics so it is more suitable as an FCC feed rather than as high quality ULSD.

The process of the invention leads to substantial economic benefits as illustrated in Table 2.

Example 2 (Comparative)

This example shows how the 260-390° C. diesel quality improves with additional hydrocracking when compared to only hydrotreating a HVGO. The results are shown in Table 3. The 260-390° C. diesel is produced at 80 bar hydrogen pressure.

TABLE 3

| Properties | Hydrotreater Effluent | 37% conversion in hydrocracker | 66% conversion in hydrocracker |
|---|---|---|---|
| Sulfur, wppm | 45 | <10 | <10 |
| Specific gravity | 0.890 | 0.881 | 0.860 |
| Cetane Index D-976 | 44.6 | | |
| Total Aromatics, wt % | 46.2 | 40.0 | 31.6 |

The results in Table 3 show that the qualities of an HVGO improve with conversion, as the specific gravity decreases and the cetane index increases.

Example 3 (Comparative)

This example illustrates a simplified comparison of both a conventional medium pressure hydrocracking process and a high pressure hydrocracking process using a conventional hydrocracker as compared with the process of the invention, i.e. a medium pressure partial conversion hydrocracking process. The same pressure level was used in both the MHC and the process of the invention. Sufficient catalyst was used to achieve ULSD sulfur level (10 wppm). Table 4 shows the performance that can be achieved by the process of the invention.

TABLE 4

| Process type | Medium pressure HC | Partial pressure HC | Inventive process |
|---|---|---|---|
| Reactor Pressure, barg | 100 | 160 | 100 |
| Gross Conversion[1], % vol. | 30 | 30 | 30 |
| Diesel[2] Yield, % vol. | 31.0 | 31.5 | 28.0 |
| Diesel Sulfur, wppm | 10 | 10 | 10 |
| Diesel Density, kg/m$^3$ | 875 | 845 | 845 |
| Cetane Index, D-4737 | 46 | 52 | 47 |
| Total Installed Cost[3] | 1.0 | 1.3 | 1.1 |
| Hydrogen Demand | 1.0 | 1.8 | 1.3 |

[1]100 minus volume percent of fractionator bottoms FCC feed
[2]Full range diesel cut, 150-360° C. TBP (true boiling point)
[3]Cost relative to the medium pressure HC unit (not including hydrogen generation).

The results shown in Table 4 indicate that it is not possible for a MHC process to make the equivalent diesel density and cetane quality as compared to the process of the invention. Increasing hydrogen pressure to achieve sufficient aromatic saturation to match the diesel density achieved with the invention requires about 60% higher operating pressure for the conventional hydrocracker unit as shown by the results in Table 4.

For a unit processing 5000 tonnes per day of total charge, it is estimated that the process of the invention can save 10 to 20 million Euro capital cost compared to a high pressure conventional once-through partial conversion hydrocracker making the same product quality. Hydrogen is also used more efficiently using the apparatus of the invention resulting in a savings of 250,000 normal cubic meters of hydrogen per day. The annual operating cost savings based hydrogen demand would be 2 to 3 million euro. Utility costs are lowered relative to the high pressure hydrocracker option, mainly as a result of decreased hydrogen makeup and recycle compression requirements.

The invention claimed is:

1. Apparatus for the partial conversion hydrocracking process comprising
    an FCC unit,
    a hydrocracker unit,
    a hydrotreating reactor having one or more catalytic beds and in series with a hydrocracking reactor, and having an liquid/vapour separation system downstream the one or more catalytic beds of the hydrotreating reactor, the liquid/vapour separation system comprising an outlet device and an outlet pipe in a separator vessel, the outlet pipe being provided with a flow control element for regulating the flow of liquid through the outlet pipe to obtain a controlled portion and an excess liquid portion, the outlet device comprising a pipe extension above the bottom of the separation vessel, the pipe extension being provided with a first anti-swirl baffle at the top open end of the pipe extension to remove both vapour and liquid from the separator vessel to the hydrocracker unit, the outlet pipe being provided at the bottom of the separator vessel, the outlet pipe being provided with a second anti-swirl baffle to remove only the controlled portion of the liquid from the separator vessel to the FCC unit, the first anti-swirl baffle being located at liquid interface level.

2. Apparatus according to claim 1, wherein the separator vessel is integrated in the hydrotreating reactor downstream the last catalytic bed of the one or more catalytic beds.

3. Apparatus according to claim 1, wherein the separator vessel is located downstream the hydrotreating reactor.

4. Apparatus according to claim 1, wherein the flow control element comprises a flow control valve.

* * * * *